United States Patent
Kalopissis et al.

[11] 3,856,810
[45] Dec. 24, 1974

[54] 4-HYDROXY-7-METHYL-BENZIMIDOZOLE

[75] Inventors: Gregoire Kalopissis, Paris; Andrée Bugaut, Boulogne-sur-Seine, both of France

[73] Assignee: Societe Anonyme dite : L'Oreal, Paris, France

[22] Filed: Jan. 19, 1972

[21] Appl. No.: 219,149

Related U.S. Application Data

[63] Continuation-in-part of Ser. No. 832,867, June 12, 1969, Pat. No. 3,658,455.

[52] U.S. Cl. ............................................ 260/309.2
[51] Int. Cl. ............................................. C07d 49/38
[58] Field of Search ................................. 260/309.2

[56] References Cited
UNITED STATES PATENTS
2,663,712  12/1953  Tulagin ........................... 260/309.2

*Primary Examiner*—Henry R. Jiles
*Assistant Examiner*—Mildred A. Crowder
*Attorney, Agent, or Firm*—Cushman, Darby & Cushman

[57] ABSTRACT

A benzimidazole derivative having the formula

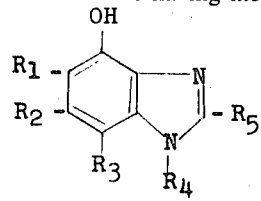

wherein $R_1$, $R_2$, $R_3$ and $R_5$ represent hydrogen or methyl with at least one $R_1$ and $R_3$ being hydrogen and $R_4$ represents hydrogen or alkyl having 1–4 carbon atoms is prepared by heating to reflux a compound having the formula

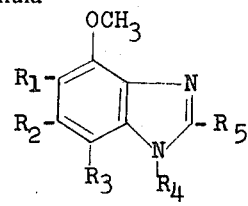

with HBr. These compounds are used in hair dyeing compositions.

2 Claims, No Drawings

4-HYDROXY-7-METHYL-BENZIMIDOZOLE

This application is a continuation-in-part of our earlier application SN 832,867 filed June 12, 1969, now U.S. Pat. No. 3,658,455.

The present invention relates to novel benzimidazole derivatives and to their preparation, which derivatives are usefully employed, as a coupler, in combination with an oxidation dye such as an aromatic ortho- or paradiamine and an ortho- or paraminophenol in the dyeing of keratinic fibers, especially human hair.

More particularly, the present invention relates to a benzimidazole derivative and to the preparation thereof, said derivative being selected from the group consisting of (1) a compound having the formula

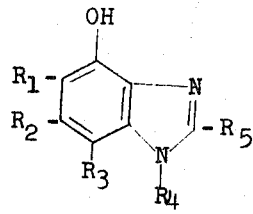

wherein $R_1$, $R_2$, $R_3$ and $R_5$ each independently are selected from the group consisting of hydrogen and methyl, with at least one of $R_1$ and $R_3$ being hydrogen and $R_4$ represents a member selected from the group consisting of hydrogen and alkyl having 1–4 carbon atoms, and (2) the acid salts of said compound. Preferably, the acid salts are the halohydric acid salts such as HCl, H Br and the like.

The benzimidazole derivatives of the present invention are prepared by heating at reflux with hydrobromic acid a compound having the formula

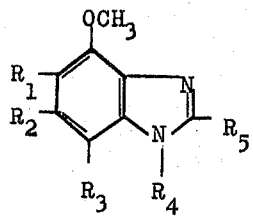

wherein $R_1$, $R_2$, $R_3$, $R_4$ and $R_5$ have the meaning given above. In case where $R_4$ is not hydrogen this reaction is performed after having treated a compound of formula

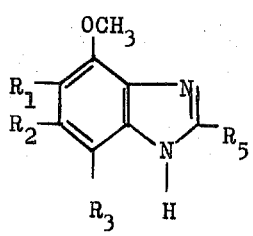

wherein $R_1$, $R_2$, $R_3$ and $R_5$ have the meaning given above with an alkylation agent $R'_4Z$ wherein Z is halogen and $R'_4$ is alkyl having 1–4 carbon atoms. Generally, the molar ratio of alkylation agent to benzimidazole will range between about 1,1 to 5 and the reaction is effected generally at a temperature of about 15° to 100°C at atmospheric pressure although superatmospheric pressure can also be employed. Generally, the molar ratio of hydrobromic acid to said methoxy substituted benzimidazole will range from about 2,5 to 10.

The benzimidazole derivatives of the present invention, as stated above, are usefully employed in the production of a composition for dyeing keratinic fibers, and particularly human hair, which composition is essentially characterized by the fact that it contains:

1. At least one base selected from the group consisting of compounds having molecules which contain an aromatic nucleus having either two amino groups or one amino group and a hydroxyl group in ortho or para position with respect to each other, wherein the amino groups can be unsubstituted and/or substituted amino groups and wherein the term amino is used in its broad sense, including for instance, substituted amino groups such as, alkylamino, dialkylamino, carbamylamino, aminoalkylamino, etc.; and 2. at least one coupler consisting of a benzimidazole derivative selected from the group consisting of (a) a compound having the formula

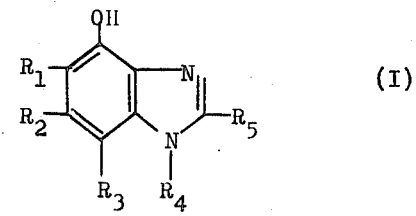

wherein $R_1$, $R_2$, $R_3$ and $R_5$ represent hydrogen or a methyl radical, with at least one of $R_1$ and $R_3$ being hydrogen, and $R_4$ represents hydrogen or alkyl radical having 1 to 4 carbon atoms, and (b) the acid salts of said compound.

Preferably, these acid salts are the halohydric acid salts, such as HCl, H Br and the like.

Among the bases which can advantageously be used with the couplers of formula (I) are: paraphenylene diamine, paratoluylene diamine, paraaminophenol, N-methyl paraaminophenol, chloro-paraphenylene diamine, methoxy-paraphenylene diamine, 6-methoxy 3-methyl paraphenylene diamine, (N-ethyl, N-carbamylmethyl) paraphenylene diamine, and 2,5-diamino pyridine.

Among the couplers of formula (I) are 4-hydroxy benzimidazole, 2-methyl 4-hydroxy benzimidazole, 4-hydroxy 7-methyl benzimidazole, 1-methyl 4-hydroxy benzimidazole, and 1-butyl-4-hydroxy-benzimidazole.

Generally, in the hair dyeing compositions, the ratio between the base and coupler can vary within broad limits. The preferred ratio range is 1/1 to 1/3 and in general an excess of coupler is preferred. These hair dyeing compositions can also contain other dyes suitable for use under the same conditions, such as direct dyes (e.g., azo or anthraquinone dyes) or dyes obtained by combining bases and couplers other than those to which the present invention is directed.

The hair dyeing compositions can also contain wetting agents, dispersing agents, penetrating agents, or other ingredients conventionally used in dyeing hair and they can take the form of an aqueous solution, a cream, or a gel.

Generally, these hair dyeing compositions are used in the usual manner at an alkaline pH, preferably between 8 and 10, which pH can be obtained for example, by adding ammonia, and the compositions are applied to the hair in the presence of an oxidizing solution, which is preferably a hydrogen peroxide solution.

The new couplers according to the present invention make it possible to obtain a very broad range of colors, extending from blonde to blues to gray.

Representative examples of the preparation of new couplers and the preparation of dyeing compositions containing them will now be given purely by way of illustration. The percentages are given in terms of parts or percentages by weight, and the temperatures in degrees centigrade.

EXAMPLE 1

Preparation of 4-Hydroxy Benzimidazole Hydrobromide

The process is started with 4-methoxy benzimidazole (Melts at 170°), a product which is described in known chemical literature, and is obtained by heating 2,3-diamino anisole dihydrochloride in the presence of formic acid.

(4-methoxy benzimidazole - Chem. Abst. 48-6436h and 4-methoxy 2-methyl benzimidazole - J. Pharm. and Pharmacol 8 661 1956)

0.075 mols (11.1g) of 4-methoxy benzimidazole is heated at reflux for 5 hours in 50 cm³ of hydrobromic acid (density = 1.78). After cooling, 15.5g of 4-hydroxy benzimidazole hydrobromide is separated out by drying. After recrystallization in hydrobromic acid, this melts with decomposition at 275°–278°.

| Analysis | Calculated by $C_7H_7N_2O$ Br | Found |
|---|---|---|
| C % | 39.07 | 39.06 |
| H % | 3.25 | 3.30 |
| N % | 13.02 | 13.21 |

EXAMPLE 2

Preparation of 2-methyl 4-hydroxy benzimidazole hydrobromide

The process is started with 2-methyl 4-methoxy benzimidazole (which melts at 164°), a product which is described in known literature, which is obtained by heating 2,3-diamino anisole dihydrochloride in acetic acid.

0.063 mols (10.2g) of 2-methyl 4-methoxy benzimidazole is heated to reflux in 45 cm³ of hydrobromic acid (density = 1.78). After cooling, drying yields 12.5g of 2-methyl 4-hydroxy benzimidazole hydrobromide which, after recrystallization in hydrobromic acid, melts with decomposition at 276°-280°.

| Analysis | Calculated for $C_8H_9N_2O$ Br | Found |
|---|---|---|
| C % | 41.92 | 41.63 – 41.64 |
| H % | 3.93 | 3.83 – 4.01 |
| N % | 12.22 | 12.11 |

EXAMPLE 3

Preparation of 4-hydroxy 7-methyl benzimidazole hydrobromide

The starting product is 2,3-dinitro 4-methyl anisole (which melts at 133°C), which product is described in chemical literature and may be obtained by nitrating 3-nitro 4-methyl anisole.

The dinitro derivative is reduced to 2,3-diamino 4-methyl anisole and this orthodiamine is then transformed by the conventional Phillipp process into 4-methoxy 7-methyl benzimidazole which, after treatment with hydrobromic acid, yields 4-hydroxy 7-methyl benzimidazole hydrobromide.

First Step

Preparation of 2,3-diamino 4-methyl anisole dihydrochloride 0.05 mols (10.6g) of 2,3-dinitro 4-methyl anisole is added little by little, while stirring, to a mixture containing 29.4g of powdered zinc and 0.5g of ammonium chloride in 165 cm³ of absolute alcohol and 42 cm³ of water, which mixture has first been heated to 70°C. When the reduction has been completed the reaction mixture is dried and the filtrate introduced into 35 cm³ of concentrated hydrochloric acid which has first been cooled to −10°. After a night at −10°, it is dried and after washing with acetone the yield is 10.4g of 2,3-diamino 4-methyl anisole dihydrochloride.

Second Step

Preparation of 4-methoxy 7-methyl benzimidazole 0.0462 mols (10.4g) of 2,3-diamino 4-methyl anisole dihydrochloride is heated for 4 hours at reflux in 70 cm³ of formic acid.

This is vacuum dried and the residue is dissolved in 50 cm³ of water, and alkalized with ammonia. Drying yields 6g of 4-methoxy 7-methyl benzimidazole which, after recrystallization in propyl alcohol, melts at 233°.

The molecular weight, as determined by potentiometric measurement, was 162.

Third Step

Preparation of 4-hydroxy 7-methyl benzimidazole hydrobromide 0.03 mols (4.86g) of 4-methoxy 7-methyl benzimidazole is heated at reflux for 5 hours in 20 cm³ of hydrobromic acid (density = 1.78). After cooling, drying yields 6.8g of 4-hydroxy 7-methyl benzimidazole hydrobromide which, after recrystallization in hydrobromic acid, melts and decomposes at 286°-270° (hygroscopic).

EXAMPLE 4

Preparation of 1-methyl 4-hydroxy benzimidazole hydrobromide 4-methoxy benzimidazole is treated with methyliodide to obtain 1-methyl 4-methoxy benzimidazole, which is then treated with hydrobromic acid.

First Step

Preparation of 1-methyl 4-methoxy benzimidazole 0.127 mols (18g) of methyl iodide is added to a solution of 0.0845 mols (12.5g) of 4-methoxy benzimidazole in 125 cm³ of absolute ethyl alcohol containing 0.127 mols (7.1g) of potash. The reaction mixture is left overnight at ambient temperature, and filtered. The alcohol is evaporated and the residue fractionally distilled under vacuum. The yield is 10.5g of 1-methyl 4-methoxy benzimidazole.

E 0.5 mm $Hg$ = 121°*, Melting point = 50°

*(Ebullition point under a pressure of 0.5 mm of mercury).

Second Step

Preparation of 1-methyl 4-hydroxy benzimidazole hydrobromide 0.064 mols (10.49g) of 1-methyl 4-methoxy benzimidazole is heated at reflux for four hours in 45 cm³ of hydrobromic acid (density = 1.78). After cooling, drying yields 8g of 1-methyl 4-hydroxy benzimidazole hydrobromide, which melts and decomposes at 230°-232°.

EXAMPLE 5

Preparation of 1-butyl 4-hydroxy benzimidazole hydrobromide 4-methoxy benzimidazole is treated with butyl bromide to obtain 1-butyl 4-methoxy benzimidazole, which is then treated with hydrobromic acid.

First Step

Preparation of 1-butyl 4-methoxy benzimidazole 0.063 mols (8.63g) of normal butyl bromide is added to a solution of 0.042 mols (6.26g) of 4-methoxy benzimidazole in 35 cm³ of absolute ethyl alcohol containing 0.063 mols (3.53g) of potash. The reaction mixture is heated at reflux for 3 hours, cooled and filtered. The alcohol is filtered and the residue is fractionally distilled under vacuum. The yield is 6.52g of 1-butyl 4-methoxy benzimidazole in the form of a thick colorless oil.

E 0.5 mm Hg= 160°.*

*(Ebullition point under a pressure of 0.5 mm of mercury.)

Second Step

Preparation of 1-butyl 4-hydroxy benzimidazole hydrobromide 0.048 mols (9.73g) of 1-butyl 4-methoxy benzimidazole is heated at reflux for 4 hours in 35 cm³ of hydrobromic acid (density = 1.78). After cooling, drying yields 8.20g of 1-butyl 4-hydroxy benzimidazole hydrobromide which melts and decomposes at 154°–157°.

EXAMPLE 6

Preparation of 1-methyl 4-hydroxy benzimidazole

The compound of example 4, namely 1-methyl 4-hydroxybenzimidazole hydrobromide, is reacted with an ammonia solution having a pH of 8. The product thus obtained melts at 251°C.

| Analysis | Calculated for $C_8H_8N_2O$ | Found |
| --- | --- | --- |
| C% | 64.86 | 64.75 |
| H% | 5.4 | 5.5 |
| N% | 18.92 | 18.74 |

EXAMPLE 7

The following dyeing solution is prepared:

| | | |
| --- | --- | --- |
| Paratolylene diamine | 1 | g |
| Paraaminophenol | 0.5 | g |
| 4-hydroxy 7-methyl benzimidazole | 2 | g |
| Aqueous solution of lauryl ammonium sulfate containing 20% of the active product expressed as lauryl alcohol | 20 | g |
| Ethylene diamino tetraacetic acid sold under the trademark "TRILON B" | 0.3 | g |
| 20% ammonia | 10 | g |
| 40% sodium bisulfite | 1 | g |
| Water q.s.p. | 100 | g |

This solution is mixed weight for weight with 6% hydrogen peroxide and left 30 minutes on 100% white hair. The result is a reddish chestnut color, which is stable when exposed to the light.

EXAMPLE 8

The following dyeing solution is prepared:

| | | |
| --- | --- | --- |
| 2-methyl 4-amino 5-methoxy aniline | 1.2 | g |
| Paraaminophenol | 0.5 | g |
| Resorcinol | 0.1 | g |
| 4-hydroxy 7-methyl benzimidazole | 2 | g |
| Aqueous solution of lauryl ammonium sulfate (20% lauryl alcohol) | 20 | g |
| Ethylene diamino tetraacetic acid sold under the trademark "TRILON B" | 0.3 | g |
| 20% ammonia | 10 | g |
| 40% sodium bisulfite | 1 | g |
| Water q.s.p. | 100 | g |

This solution mixed weight for weight with 6% hydrogen peroxide is left for 30 minutes on 100% white hair. The result is a bright golden chestnut, which is stable when exposed to the light.

EXAMPLE 9

The following dyeing solution is prepared:

| | | |
| --- | --- | --- |
| Paratolylene diamine | 1 | g |
| N-methyl paraaminophenol | 0.6 | g |
| Resorcinol | 0.1 | g |
| 4-hydroxy benzimidazole hydrobromide | 1.9 | g |
| Lauryl ammonium sulfate solution (20% lauryl alcohol). | 20 | g |
| Ethylene diamino tetraacetic acid sold under the trademark "TRILON B" | 0.3 | g |
| 20% ammonia | 10 | g |
| 40% sodium bisulfite | 1 | g |
| Water q.s.p. | 100 | g |

This solution, mixed weight for weight with 6% hydrogen peroxide is left 30 minutes on 100% white hair. The result is a plum-colored chestnut shade which is stable when exposed to the light.

EXAMPLE 10

The following dyeing solution is prepared:

| | | |
| --- | --- | --- |
| Paratolylene diamine | 1 | g |
| 4-hydroxy 7-methyl benzimidazole | 2 | g |
| Lauryl ammonium sulfate solution (20% lauryl alcohol). | 20 | g |
| Ethylene diamino tetraacetic acid sold under the trademark "TRILON B". | 0.3 | g |
| 20% ammonia | 10 | g |
| 40% sodium bisulfite | 1 | g |
| Water q.s.p. | 100 | g |

This solution when mixed weight for weight with 6% hydrogen peroxide and applied to 100% white hair, yields, at the end of 30 minutes a reddish chestnut which is stable to the light.

EXAMPLE 11

The following dyeing solution is prepared:

| | | |
| --- | --- | --- |
| 2-methyl 4-amino 6-methoxy aniline | 1.2 | g |
| 4-hydroxy 7-methyl benzimidazole | 2 | g |
| Lauryl ammonium sulfate solution (20% lauryl alcohol). | 20 | g |
| Ethylene diamino tetraacetic acid sold under the trademark "TRILON B" | 0.3 | g |
| 20% ammonia | 10 | g |
| 40% sodium bisulfite | 1 | g |
| Water q.s.p. | 100 | g |

This solution, when mixed weight for weight with 6% hydrogen peroxide and applied to 100% white hair yields, after 30 minutes, a bright golden chestnut which is stable when exposed to the light.

EXAMPLE 12

The following dyeing solution is prepared:

| | | |
| --- | --- | --- |
| Paratolylene diamine | 1 | g |
| 4-hydroxy benzimidazole hydrobromide | 1.9 | g |
| Lauryl ammonium sulfate solution (20% lauryl alcohol). | 20 | g |

-Continued

| | | |
|---|---|---|
| Ethylene diamino tetraacetic acid sold under the trademark "TRILON B" | 0.3 | g |
| 20% ammonia | 10 | g |
| 40% sodium bisulfite | 1 | g |
| Watr q.s.p. | 100 | g |

This solution, when mixed weight for weight with 6% hydrogen peroxide and applied to 100% white hair, yields, at the end of 30 minutes, a bluish black which is stable when exposed to the light.

EXAMPLE 13

The following dyeing solution is prepared:

| | |
|---|---|
| 2-methyl 4-amino benzimidazole dihydrochloride | 0.55 g |
| Paratolylene diamine | 0.53 g |
| 20% ammonia q.s.p. | pH 9 |
| Water q.s.p. | 100 g |

This solution, when mixed weight for weight with 6% hydrogen peroxide and applied to 100% white hair, yields, after 30 minutes a bluish green.

EXAMPLE 14

The following dyeing solution is prepared:

| | | |
|---|---|---|
| Paratolylene diamine | 1 | g |
| 2-methyl 4-hydroxy benzimidazole hydrobromide | 2 | g |
| Lauryl ammonium sulfate solution (20% lauryl alcohol). | 20 | g |
| Ethylene diamino tetraacetic acid sold under the trademark "TRILON B" | 0.3 | g |
| 20% ammonia | 10 | g |
| 40% sodium bisulfite | 1 | g |
| Water q.s.p. | 100 | g |

This solution, when mixed weight for weight with 6% hydrogen peroxide and left for 30 minutes on 100% white hair, yields a violet blue.

EXAMPLE 15

The following dyeing solution is prepared:

| | | |
|---|---|---|
| Paratoluylene diamine | 1 | g |
| 1-butyl 4-hydroxy benzimidazole hydrobromide | 2.5 | g |
| Lauryl ammonium sulfate solution (20% lauryl alcohol) | 20 | g |
| Ethylene diamino tetraacetic acid sold under the trademark "TRILON B" | 0.3 | g |
| 20% ammonia | 10 | g |
| 40% sodium bisulfite | 1 | g |
| Water q.s.p. | 100 | g |

This solution, when mixed weight for weight with 6% hydrogen peroxide and applied to 100% white hair, produces, at the end of 30 minutes, a deep blue.

The salts that are produced in the foregoing examples can be reconverted to the corresponding compounds of Formula I in any manner desired, for example by treatment with an ammonia solution.

What is claimed is:

1. A benzimidazole derivative selected from the group consisting of
  a. a compound having the formula

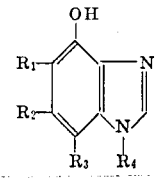

wherein $R_1$ and $R_2$ are selected from the group consisting of hydrogen and methyl, $R_3$ is methyl and $R_4$ represents a member selected from the group consisting of hydrogen and alkyl having 1–4 carbon atoms, and
  b. an acid salt of said compound.

2. 4-hydroxy-7-methyl benzimidazole.

* * * * *

UNITED STATES PATENT OFFICE
CERTIFICATE OF CORRECTION

Patent No. 3,856,810              Dated December 24, 1974

Inventor(s) Gregoire Kalopissis and Andree Bugaut

It is certified that error appears in the above-identified patent and that said Letters Patent are hereby corrected as shown below:

In the Heading:

Please add the following:

[30] Foreign Application Priority Data
        June 14, 1968 Luxembourg 56271

Signed and sealed this 29th day of April 1975.

(SEAL)
Attest:

RUTH C. MASON
Attesting Officer

C. MARSHALL DANN
Commissioner of Patents
and Trademarks